US012551786B2

(12) United States Patent
Yang et al.

(10) Patent No.: US 12,551,786 B2
(45) Date of Patent: Feb. 17, 2026

(54) JOYSTICK MODULE

(71) Applicant: Cheng Uei Precision Industry Co., LTD., New Taipei (TW)

(72) Inventors: Feng-Hsueh Yang, New Taipei (TW); Yu-Hsiang Ting, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 340 days.

(21) Appl. No.: 18/490,738

(22) Filed: Oct. 19, 2023

(65) Prior Publication Data

US 2024/0261673 A1 Aug. 8, 2024

(30) Foreign Application Priority Data

Feb. 8, 2023 (CN) ........................ 202320159708.6

(51) Int. Cl.
*A63F 13/24* (2014.01)
*H01H 9/08* (2006.01)

(52) U.S. Cl.
CPC ............... *A63F 13/24* (2014.09); *H01H 9/08* (2013.01); *H01H 2231/008* (2013.01)

(58) Field of Classification Search
CPC ..... A63F 13/24; H01H 9/08; H01H 2231/008
See application file for complete search history.

(56) References Cited

U.S. PATENT DOCUMENTS

| | | | | |
|---|---|---|---|---|
| 10,573,473 B2* | 2/2020 | Wu | A63F 13/24 | |
| 11,179,628 B2* | 11/2021 | Tseng | A63F 13/24 | |
| 12,298,800 B2* | 5/2025 | Yu | G06F 3/0338 | |
| 2023/0107217 A1* | 4/2023 | Chen | H01R 12/7082 | 463/37 |
| 2024/0245998 A1* | 7/2024 | Guinchard | A63F 13/92 | |

FOREIGN PATENT DOCUMENTS

| | | |
|---|---|---|
| CN | 215084801 U | 12/2021 |
| TW | M561319 U | 6/2018 |

* cited by examiner

*Primary Examiner* — Peter J Iannuzzi
(74) *Attorney, Agent, or Firm* — Cheng-Ju Chiang

(57) ABSTRACT

A joystick module includes a circuit board, a base, a steering stick unit, a switch module electrically connected with the circuit board, and a plurality of buckling structures. The base is disposed on the circuit board. The base is equipped with a plurality of hollow buckling units. The steering stick unit is detachably fastened to the base. The steering stick unit has a shell, a directing stick extended upward from a top surface of the shell, and a plurality of insertion feet extended downward from several portions of a bottom surface of the shell. The directing stick is shakable. The plurality of the insertion feet penetrate through the plurality of the buckling units. The plurality of the buckling structures are formed at the plurality of the insertion feet. The plurality of the buckling structures are buckled with the plurality of the buckling units.

19 Claims, 14 Drawing Sheets

JOYSTICK MODULE

CROSS-REFERENCE TO RELATED APPLICATION

The present application is based on, and claims priority from, China Patent Application No. 202320159708.6, filed Feb. 8, 2023, the disclosure of which is hereby incorporated by reference herein in its entirety.

BACKGROUND OF THE INVENTION

1. Field of the Invention

The present invention generally relates to a joystick module, and more particularly to a joystick module having a steering stick unit which is able to be quickly assembled to the joystick module to be applied in a game controller, and is able to be disassembled from the joystick module simply and quickly.

2. The Related Art

In order to increase a function and an operation feeling of a game controller, the game controller generally uses a design that a pressing switch is integrated into a steering stick unit of a joystick module of the game controller. In order to make the steering stick unit and the pressing switch operated at the same time without a mutual interference. A structure that integrates the steering stick unit with the pressing switch has become a focus in a joystick module design.

A conventional game joystick switch includes a joystick module. The joystick module includes a steering stick unit, a shell and a pressing switch. The steering stick unit is rockable and is disposed in the shell. The steering stick unit has a contacting portion. The contacting portion protrudes out of the shell. When a user presses the steering stick unit, the pressing switch is pressed through the contacting portion.

A conventional integrated handle joystick with a hall element includes a joystick module. The joystick module includes a steering stick unit and a base. The steering stick unit is rockable, and the steering stick unit is disposed in the base. A part of the steering stick unit protrudes out of the base to press a pressing switch.

However, the above-mentioned joystick module may integrate the steering stick unit and the pressing switch, and the steering stick unit and the pressing switch are integrally soldered to a circuit board. The aforesaid structure design has following deficiencies in an application. A usage life of the steering stick unit is less than a usage life of the pressing switch. When the steering stick unit is broken down, the steering stick unit is changed together with intact parts which are the pressing switch, a substrate, etc. So a waste is caused. Furthermore, when the user wants to change the steering stick unit voluntarily from the joystick module, the user need use a desoldering device to disassemble the whole joystick module from the game controller, so that a new joystick module is assembled to the game controller. Nonetheless, in the desoldering process, if the user has a slight carelessness, a damage of the whole game controller is caused. In addition, the discarded circuit boards and electronic components of the game controller usually have large amounts of harmful substances, such as heavy metals. If the discarded circuit boards and the electronic components are abandoned at will, an environmental pollution is caused.

Besides, a small amount of harmful gases will be produced in the desoldering process, although the small amount of the harmful gases is nonlethal, a human health is still affected after a long time use.

Thus, it is essential to provide an innovative joystick module having a steering stick unit which is able to be quickly assembled to the innovative joystick module to be applied in a game controller, and is able to be disassembled from the innovative joystick module simply and quickly. In addition, a user changes the innovative joystick module directly without using a desoldering tool.

SUMMARY OF THE INVENTION

An object of the present invention is to provide a joystick module having a steering stick unit which is able to be quickly assembled to the joystick module to be applied in a game controller, and is able to be disassembled from the joystick module simply and quickly. The joystick module includes a circuit board, a base, a steering stick unit, a switch module and a plurality of buckling structures. The base is disposed on a top surface of the circuit board. The base is soldered to the circuit board. The base is fastened to the circuit board. The base is electrically connected with the circuit board. The base is equipped with a plurality of hollow buckling units. The plurality of the buckling units are disposed between the circuit board and the base. The steering stick unit is detachably fastened to a top surface of the base. The steering stick unit has a shell, a directing stick extended upward from a middle of a top surface of the shell, a pressing protrusion extended outward from one side of the shell, and a plurality of insertion feet extended downward from several portions of a bottom surface of the shell. The directing stick is disposed in the shell, and the directing stick is shakable. The pressing protrusion is connected with the directing stick. The plurality of the insertion feet penetrate through the plurality of the buckling units. The switch module is electrically connected with the circuit board. The switch module is disposed to one side of the steering stick unit. The switch module has a switch body. The switch body is fastened to the top surface of the circuit board. A pressing portion is extended upward from a top surface of the switch body. The pressing portion is disposed under the pressing protrusion. The plurality of the buckling structures are formed at the plurality of the insertion feet. The plurality of the buckling structures are cooperated with the plurality of the buckling units. The plurality of the buckling structures are assembled with the plurality of the buckling units. The plurality of the buckling structures are buckled with the plurality of the buckling units.

Another object of the present invention is to provide a joystick module. The joystick module includes a circuit board, a base, a plurality of the hollow buckling units, a steering stick unit, a switch module and a plurality of buckling structures. The circuit board has a plurality of pin holes penetrating through a top surface and a bottom surface of the circuit board. The base is fastened to the top surface of the circuit board. The base has a plurality of buckling grooves, a plurality of pins and a plurality of location holes. The plurality of the buckling grooves penetrate through a top surface and a bottom surface of the base. The plurality of the pins are fastened in the plurality of the pin holes. The plurality of the pins are electrically conductive in the plurality of the location holes. The plurality of the hollow buckling units are fastened in the plurality of the buckling grooves. The plurality of the buckling units are disposed between the circuit board and the base. The steering stick unit is disposed to the top surface of the base. The steering stick unit has a shell, a directing stick extended upward from a middle of a top surface of the shell, a pressing protrusion extended outward from one side of the shell, and a plurality of insertion feet extended downward from several portions of a bottom surface of the shell. The directing stick is shakable. The pressing protrusion is connected with the directing stick. The plurality of the insertion feet are inserted into the plurality of the buckling units. The plurality of the signal feet are extended downward from a front end of a bottom surface of the steering stick unit, and one side of the bottom surface of the steering stick unit which is opposite to the pressing protrusion. The plurality of the signal feet are removably fastened in the plurality of the location holes, so the plurality of the signal feet are electrically connected with the plurality of the pins through the plurality of the location holes. The switch module is electrically connected with the circuit board. The pressing protrusion of the steering stick unit is disposed to a top of the switch module. The plurality of the buckling structures are formed at the plurality of the insertion feet. The plurality of the buckling structures are assembled with the plurality of the buckling units. The plurality of the buckling structures are removably fastened to the plurality of the buckling units. The plurality of the buckling structures are buckled with the plurality of the buckling units.

Another object of the present invention is to provide a joystick module. The joystick module includes a circuit board, a base, a plurality of hollow buckling units, a steering stick unit, a switch module and a plurality of buckling structures. The circuit board has a plurality of insertion holes penetrating through a top surface and a bottom surface of the circuit board, and a plurality of pin holes penetrating through the top surface and the bottom surface of the circuit board. The base is fastened to a top surface of the circuit board. The base is soldered to the circuit board. The base is electrically connected with the circuit board. The base has a plurality of insertion grooves penetrating through a top surface and a bottom surface of the base, a plurality of buckling grooves penetrating through the top surface and the bottom surface of the base, a plurality of pins and a plurality of location holes. Each insertion groove is disposed at a middle of a top of one buckling groove. The plurality of the pins are extended downward from several portions of the bottom surface of the base. The plurality of the pins are soldered in the plurality of the pin holes. The plurality of the location holes penetrate through the top surface and the bottom surface of the base. The plurality of the pins are electrically conductive in the plurality of the location holes. The plurality of the hollow buckling units are fastened in the plurality of the buckling grooves. The plurality of the buckling units are disposed between the circuit board and the base. The plurality of the buckling units have a plurality of buckling rings. The plurality of the buckling rings are fastened in the plurality of the buckling grooves. A middle of each buckling ring defines a penetrating hole vertically penetrating through the middle of each buckling ring. The steering stick unit is removably disposed to the top surface of the base. The steering stick unit has a shell, a directing stick extended upward from a middle of a top surface of the shell, a pressing protrusion extended outward from one side of the shell, a plurality of insertion feet are extended downward from several portions of a bottom surface of the shell, and a plurality of signal feet extended downward from a front end of a bottom surface of the steering stick unit. The directing stick is shakable. The pressing protrusion is connected with the directing stick. The plurality of the insertion feet are inserted into the plurality of the insertion holes. The plurality of the insertion feet are removably fastened with the plurality of the buckling units. The plurality of the signal feet are removably fastened with the plurality of the location holes. The switch module is fixed to the top surface of the circuit board. The switch module is electrically connected with the circuit board. The switch module is independent of the steering stick unit. The pressing protrusion of the steering stick unit is removably disposed to a top of the switch module. The plurality of the buckling structures are formed at the plurality of the insertion feet. The plurality of the buckling structures are removably fastened in the plurality of the buckling units. Each buckling structure has a bending portion and an attaching portion. A middle of each insertion foot extends outward to form the attaching portion. A top surface of the attaching portion is horizontal to define an attaching surface. A free end of the attaching portion is bent downward and rearward to form the bending portion. The attaching surface of each insertion foot abuts against a bottom surface of one buckling ring. A top of the bending portion of each insertion foot is blocked by the one buckling ring. The bending portion, and the attaching portion together with the attaching surface of each insertion foot are fastened in one insertion hole.

As described above, the steering stick unit and the switch module are independently disposed to the circuit board, the switch module is soldered to the circuit board, the base is disposed to the circuit board, the buckling unit is disposed to the base, and the buckling structures of the steering stick unit are buckled with the plurality of the buckling units, so when the steering stick unit needs detaching and changing, a user has no need of desoldering the steering stick unit. The steering stick unit is directly pulled out from the joystick module, and a new steering stick unit is assembled to the joystick module. As a result, the steering stick unit is able to be quickly assembled to the joystick module to be applied in a game controller, and the steering stick unit is able to be disassembled from the joystick module simply and quickly. In addition, the user changes the joystick module directly without using a desoldering tool.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
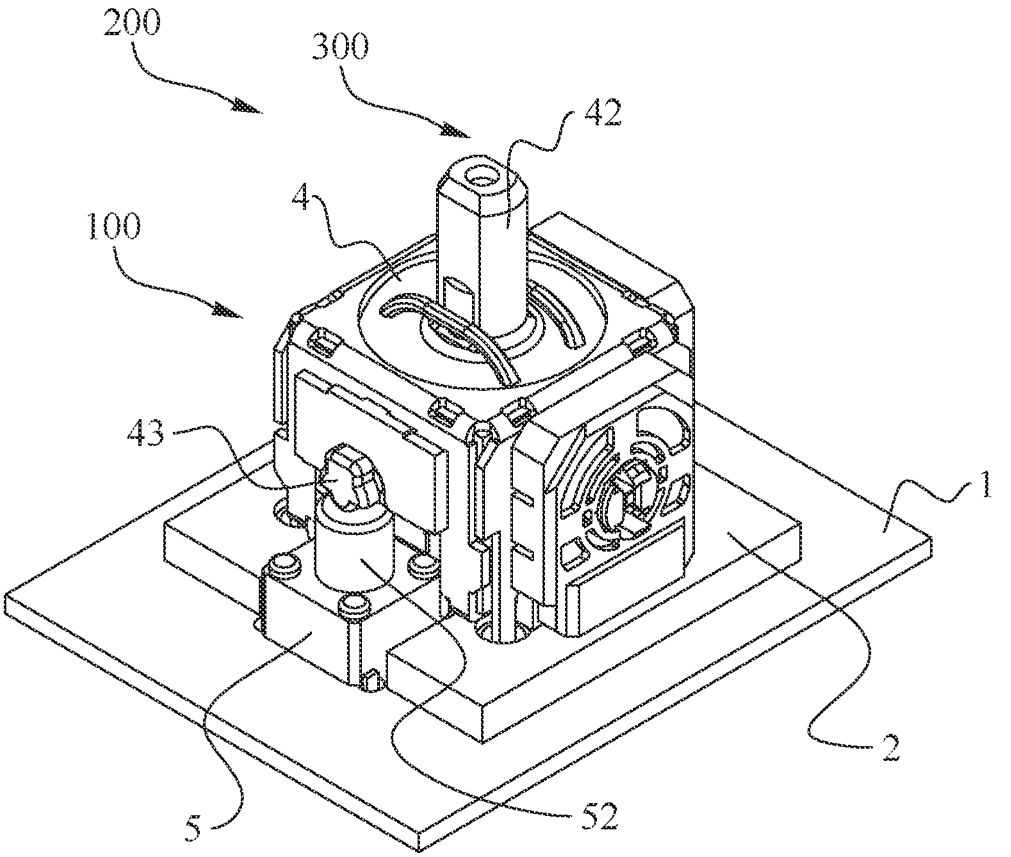
FIG. 1 is a perspective view of a joystick module in accordance with the present invention.
Figure 2:
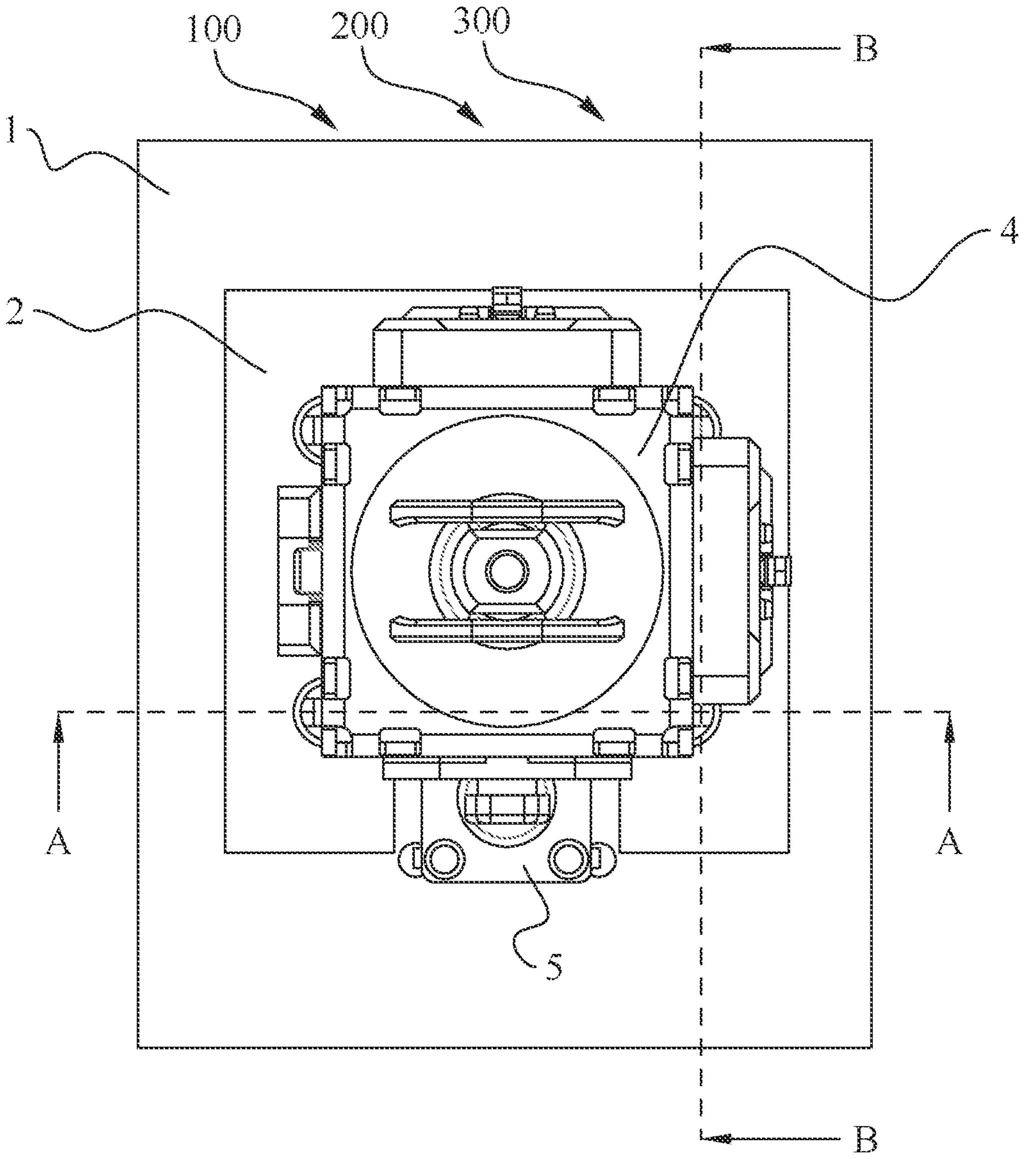
FIG. 2 is a top view of the joystick module of FIG. 1.

With reference to FIG. 1 to FIG. 7, a joystick module 100 in accordance with a first preferred embodiment of the present invention is shown. The joystick module 100 includes a circuit board 1, a base 2, a buckling unit 3, a steering stick unit 4 and a switch module 5.

The circuit board 1 is able to be selectively disposed as a part of a circuit-board substrate which is assembled in a game controller (not shown), or the circuit board 1 is an independent sub-circuit board is electrically connected with the circuit-board substrate. The base 2 is disposed on a top surface of the circuit board 1. The base 2 is soldered to the circuit board 1. The base 2 is fastened to the top surface of the circuit board 1. The base 2 is electrically connected with the circuit board 1. The buckling unit 3 is disposed between the circuit board 1 and the base 2. The buckling unit 3 is disposed in the base 2. Preferably, the joystick module 100 includes a plurality of the hollow buckling units 3. The base 2 is equipped with the plurality of the hollow buckling units 3. The plurality of the buckling units 3 are disposed between the circuit board 1 and the base 2. The steering stick unit 4 is disposed to a top surface of the base 2. The steering stick unit 4 is removably disposed to the top surface of the base 2. The steering stick unit 4 is detachably fastened to the top surface of the base 2. The switch module 5 is electrically connected with the circuit board 1. The switch module 5 is disposed to one side of the steering stick unit 4.

Figure 3:
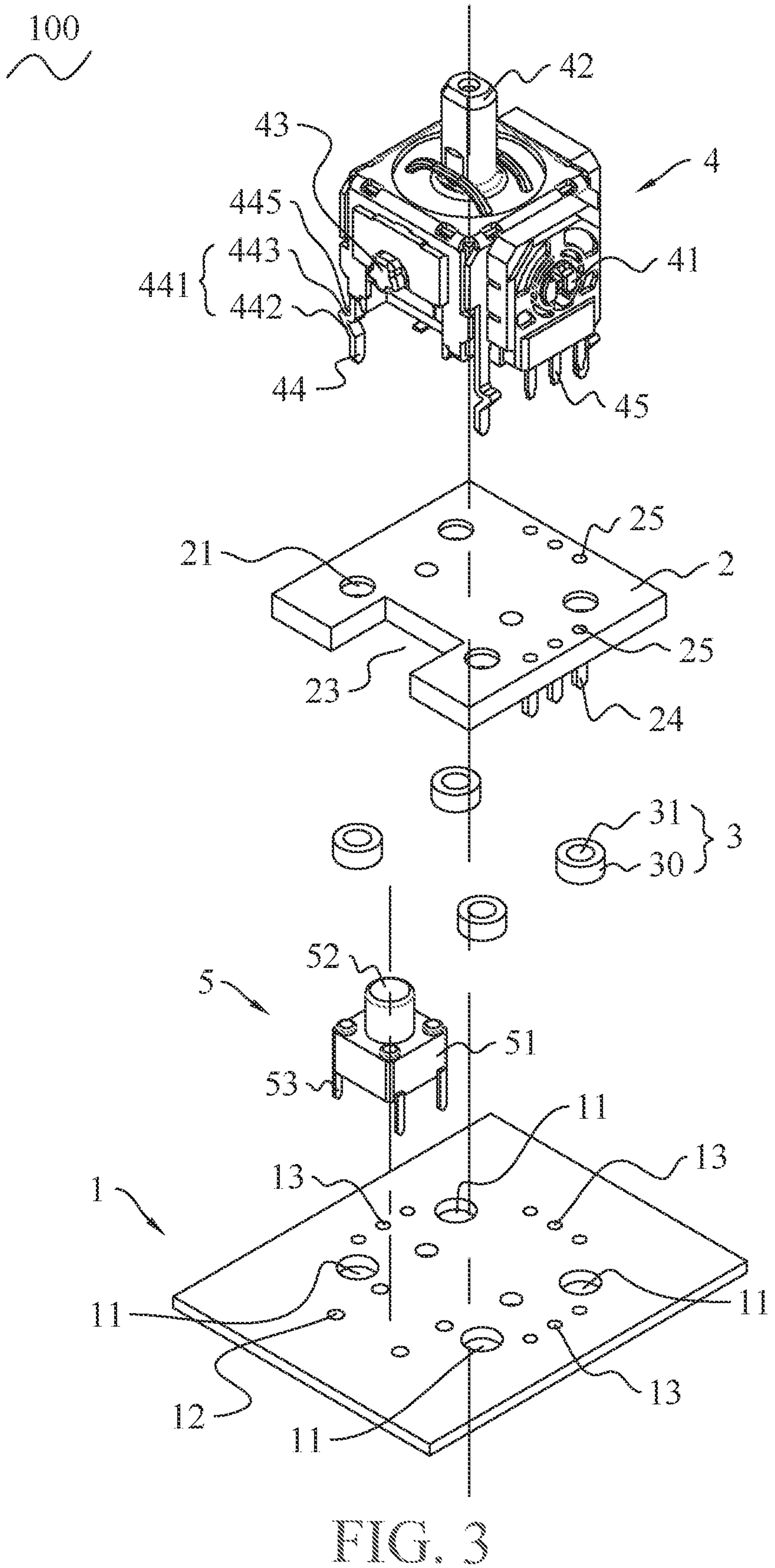
FIG. 3 is an exploded view of the joystick module in accordance with a first preferred embodiment of the present invention.
Figure 4:
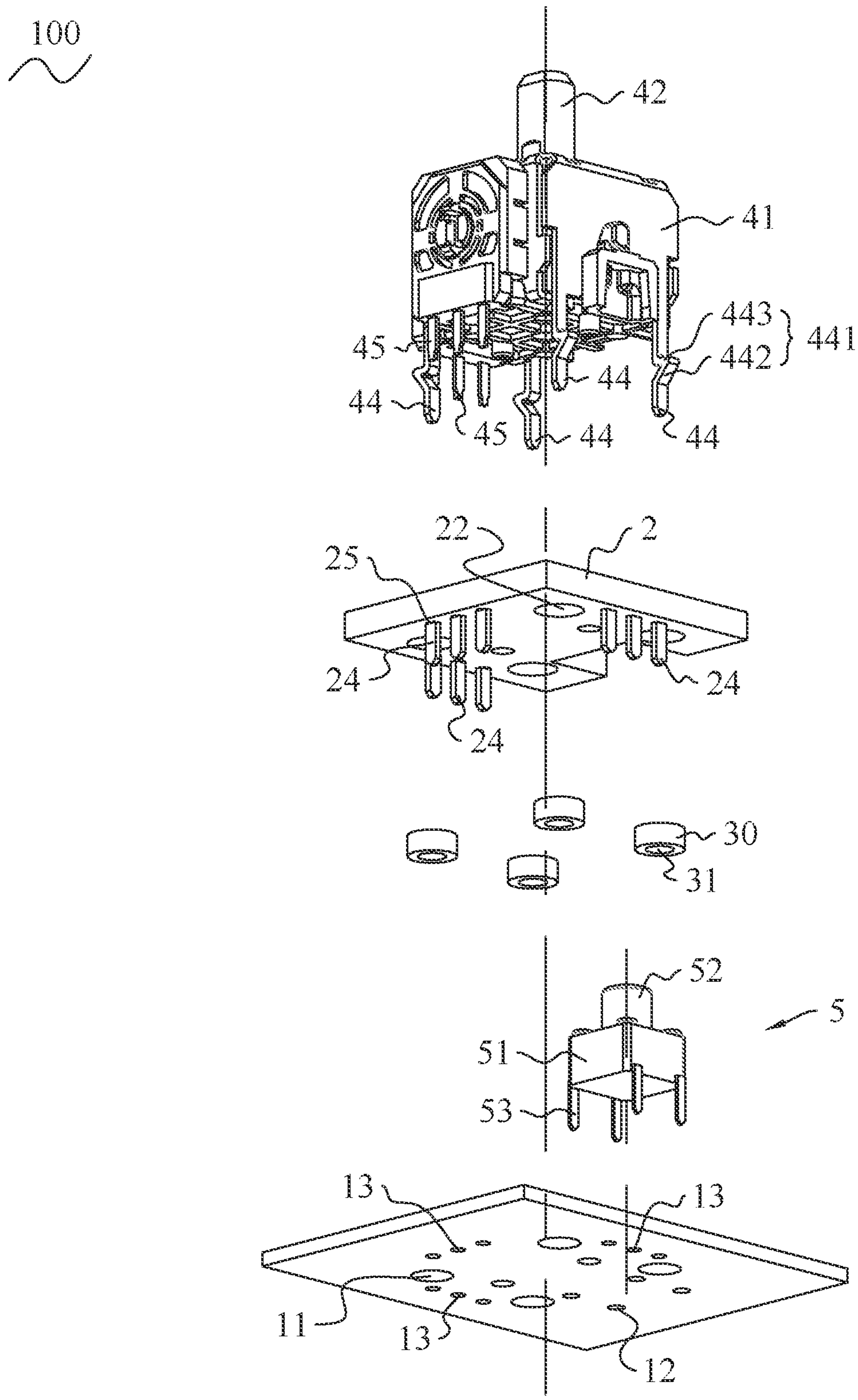
FIG. 4 is another exploded view of the joystick module in accordance with the first preferred embodiment of the present invention.
Figure 5:
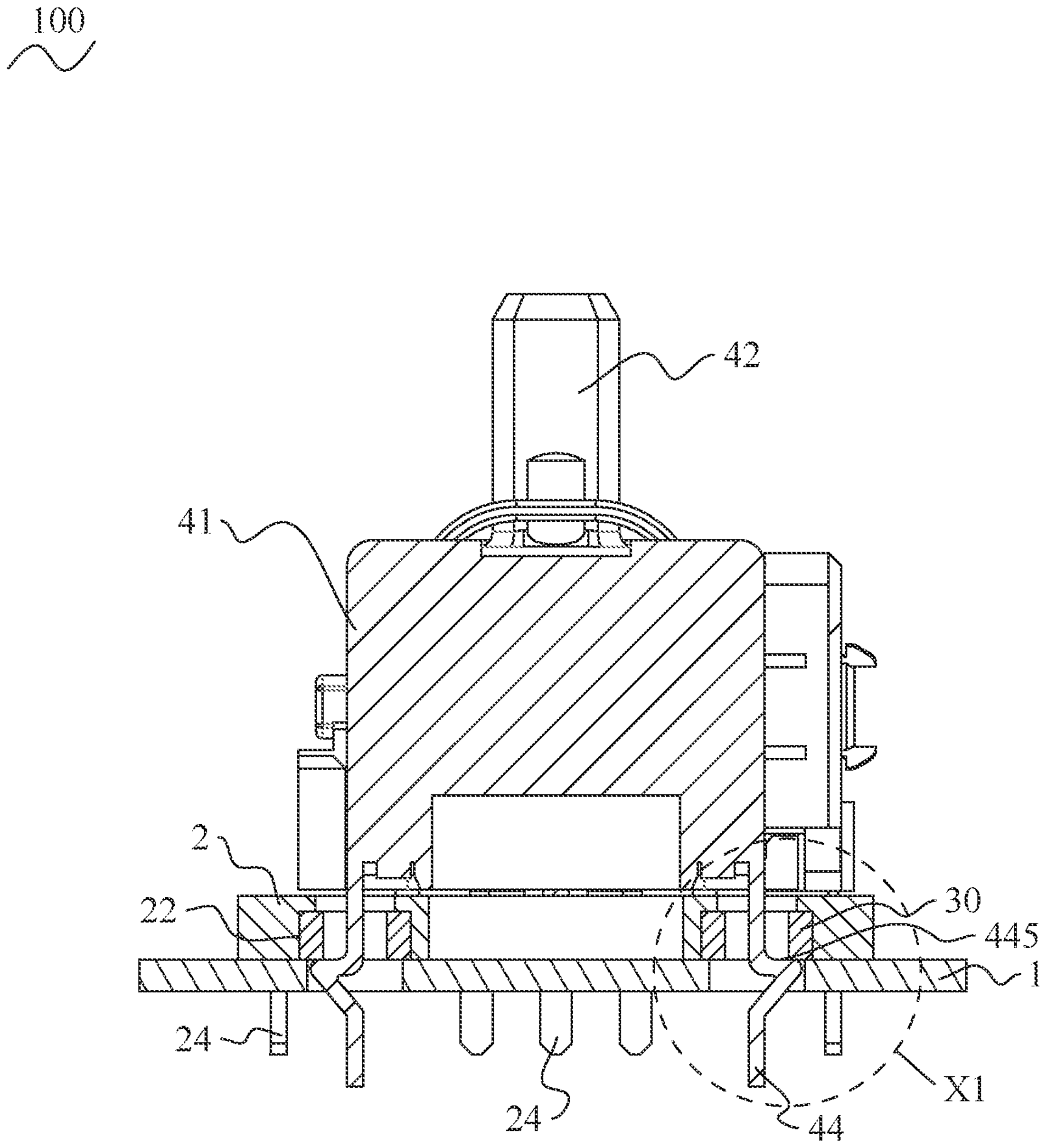
FIG. 5 is a sectional view of the joystick module along a line A-A of FIG. 2.
Figure 6:
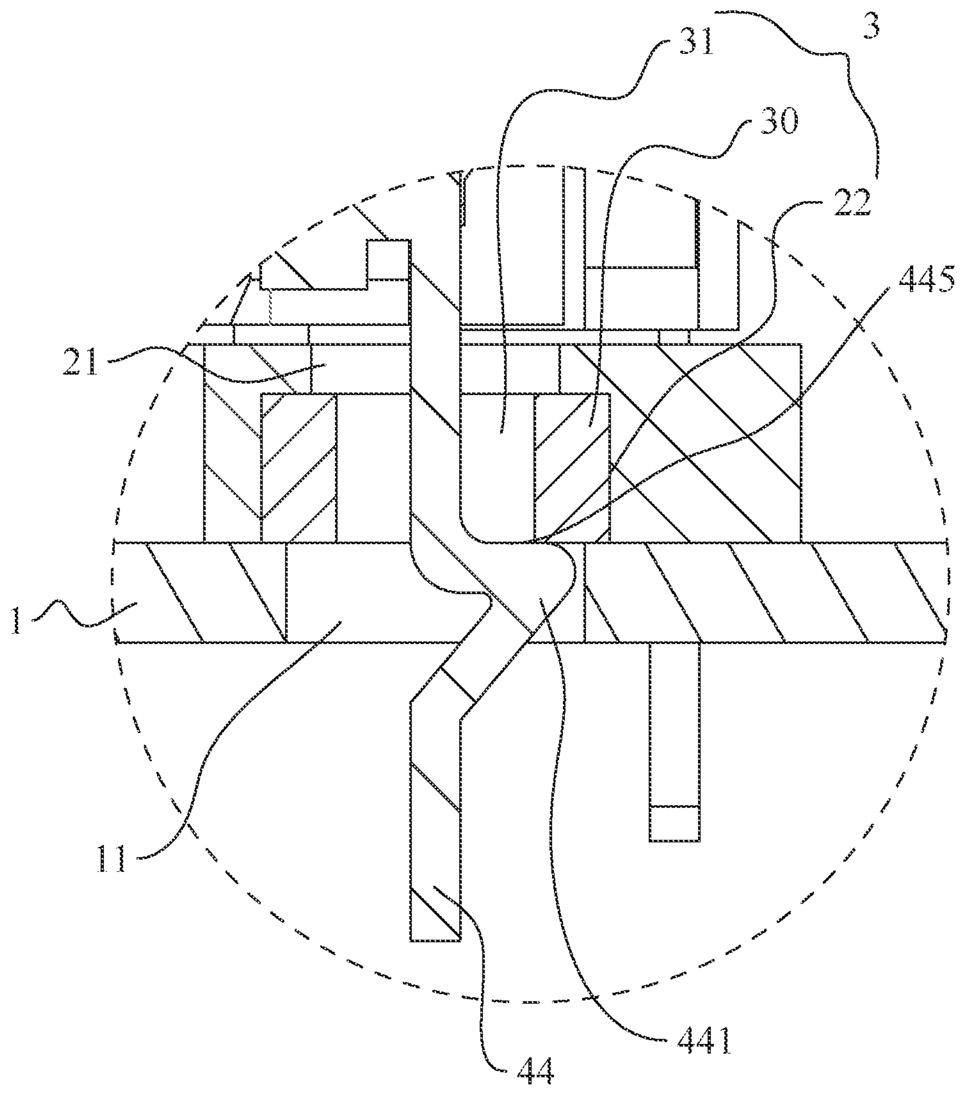
FIG. 6 is an enlarged view of an encircled portion X1 of the joystick module of FIG. 5.
Figure 7:
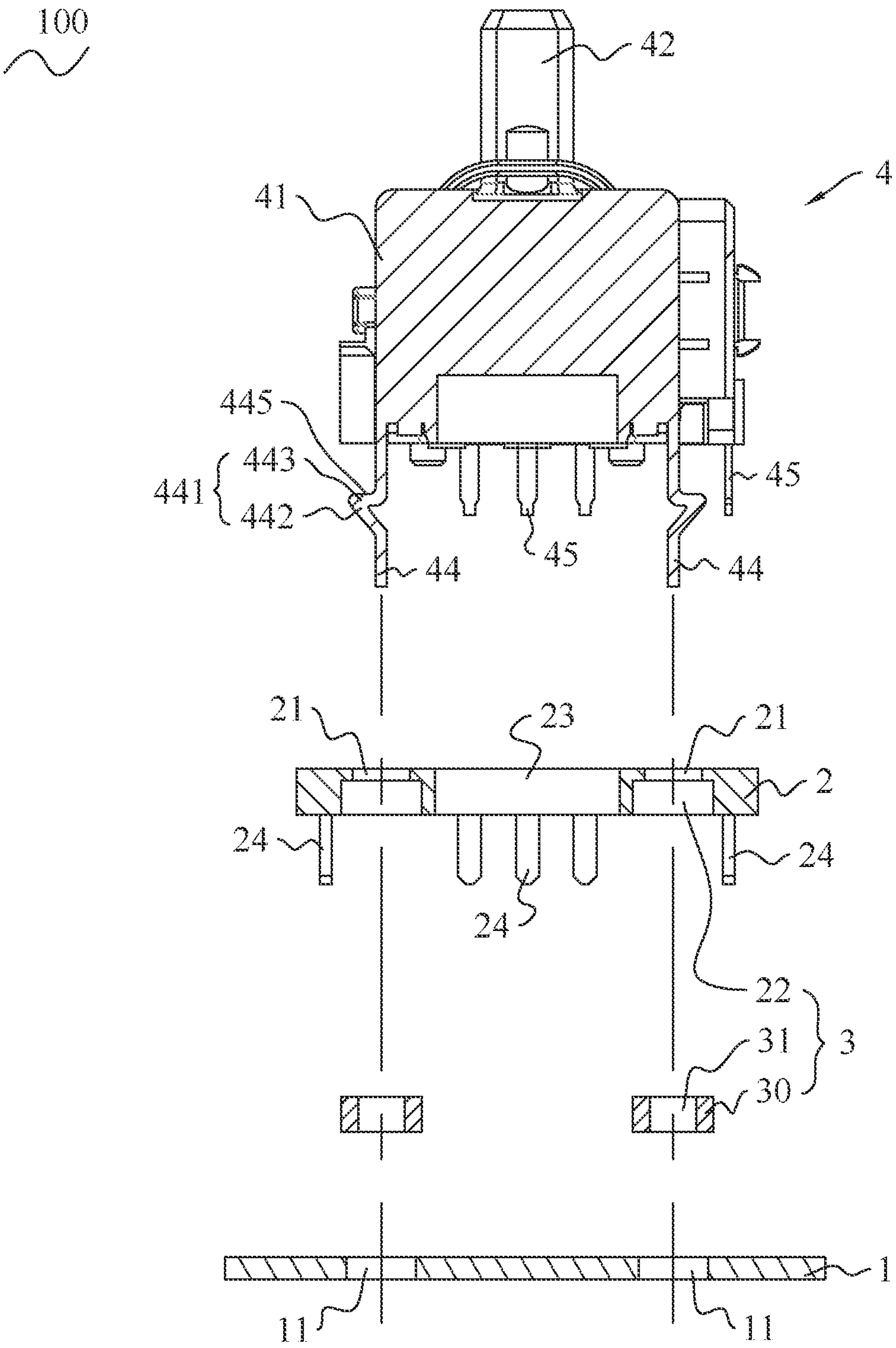
FIG. 7 is an exploded sectional view of the joystick module along a line A-A of FIG. 2.
Figure 8:
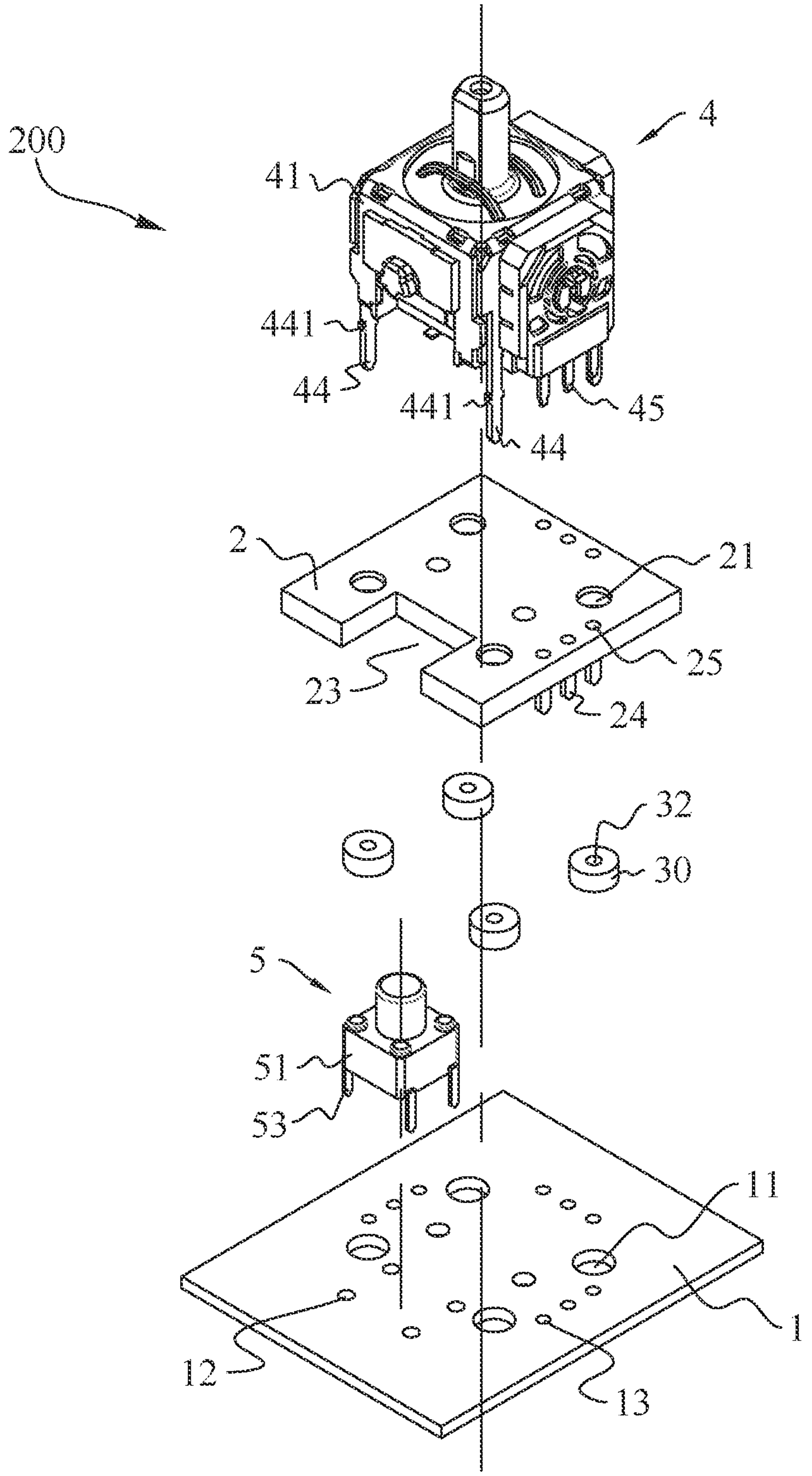
FIG. 8 is an exploded view of the joystick module of FIG. 2, wherein the joystick module is in accordance with a second preferred embodiment of the present invention.
Figure 9:
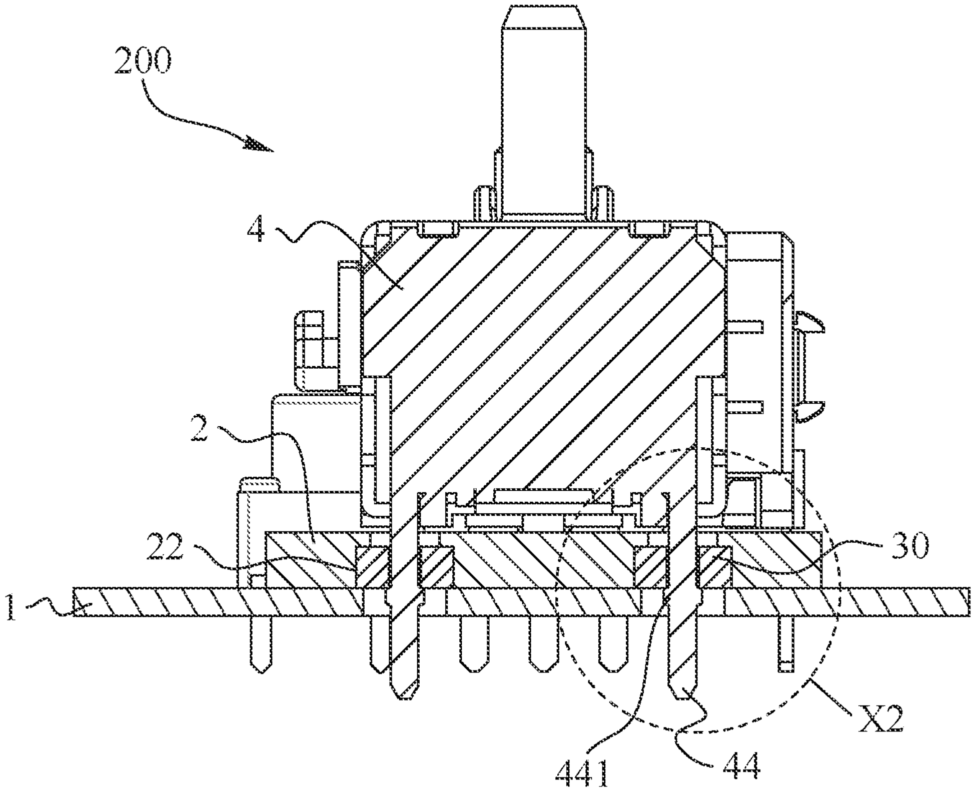
FIG. 9 is a sectional view of the joystick module along a line B-B of FIG. 2, wherein the joystick module is in accordance with the second preferred embodiment of the present invention.
Figure 10:
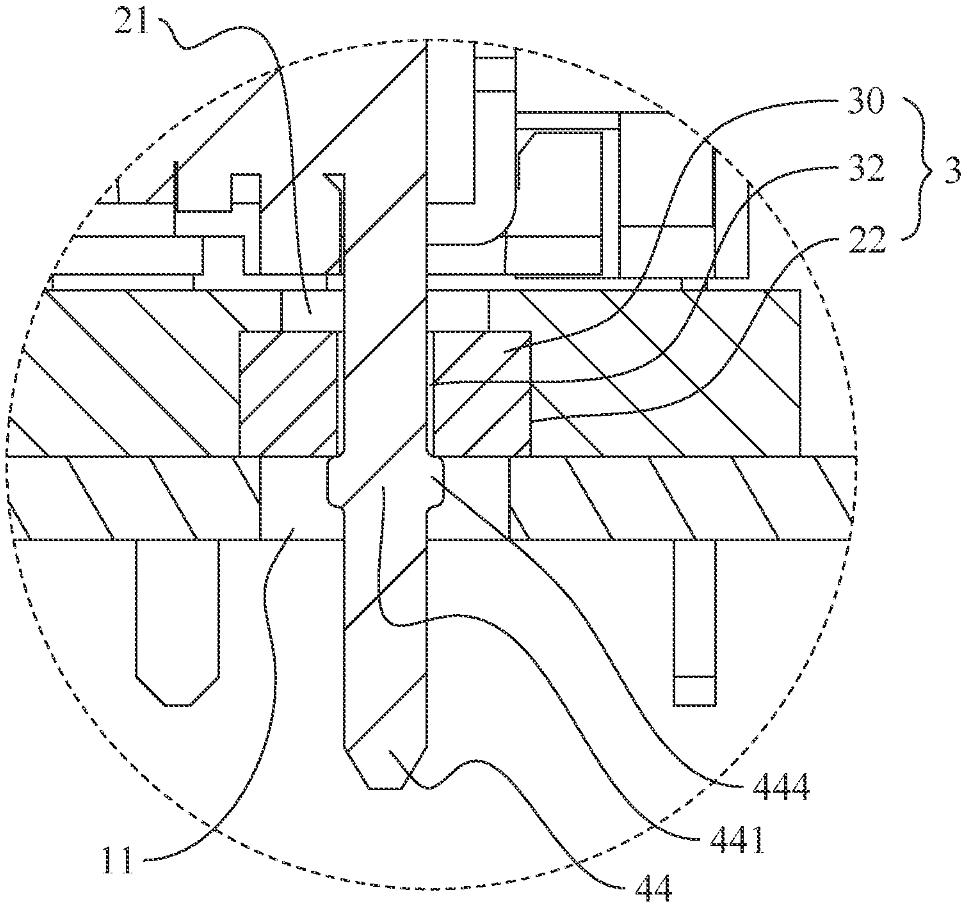
FIG. 10 is an enlarged view of an encircled portion X2 of the joystick module of FIG. 9.
Figure 11:
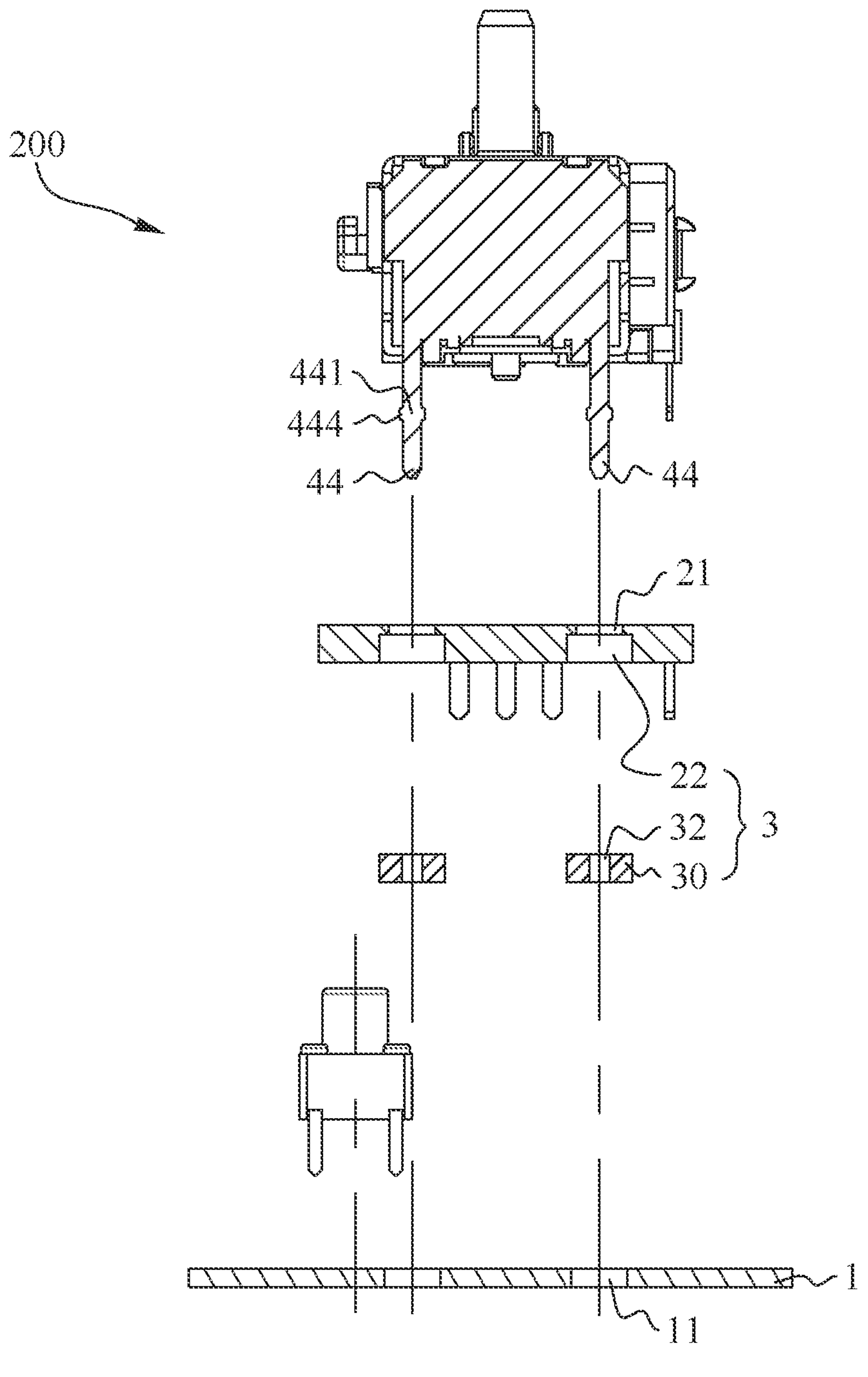
FIG. 11 is an exploded sectional view of the joystick module along the line B-B of FIG. 2, wherein the joystick module is in accordance with the second preferred embodiment of the present invention.
Figure 12:
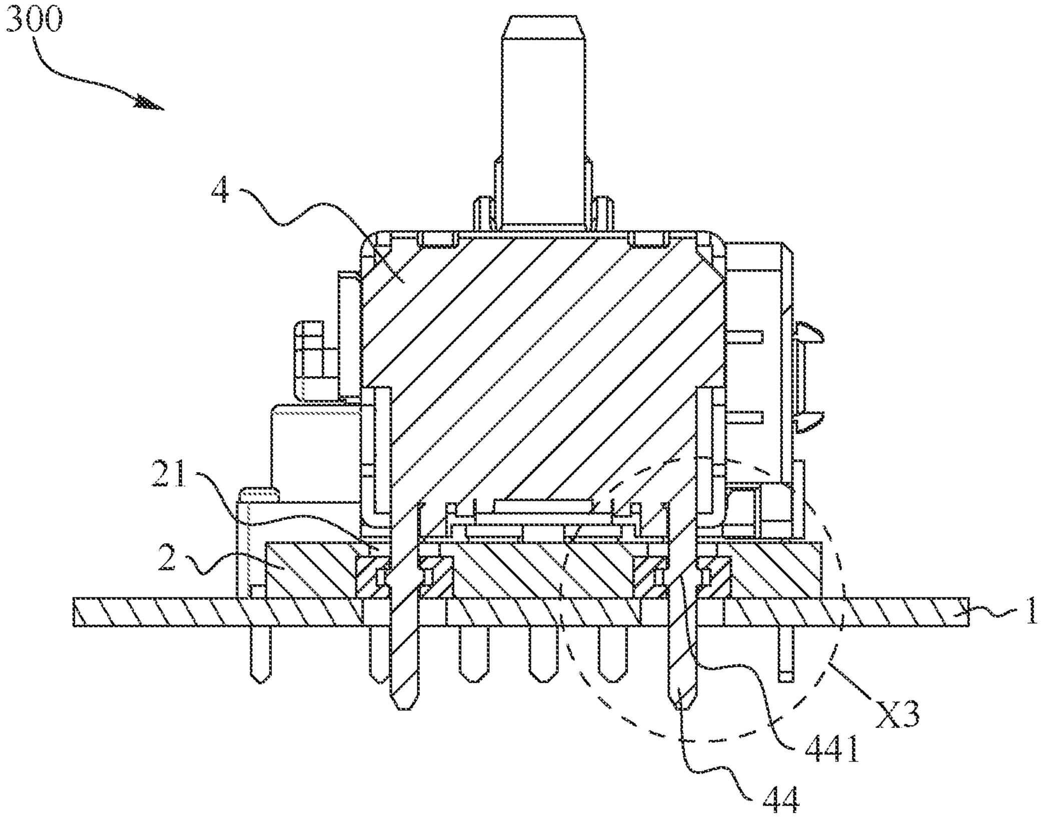
FIG. 12 is a sectional view of the joystick module along the line B-B of FIG. 2, wherein the joystick module is in accordance with a third preferred embodiment of the present invention.
Figure 13:
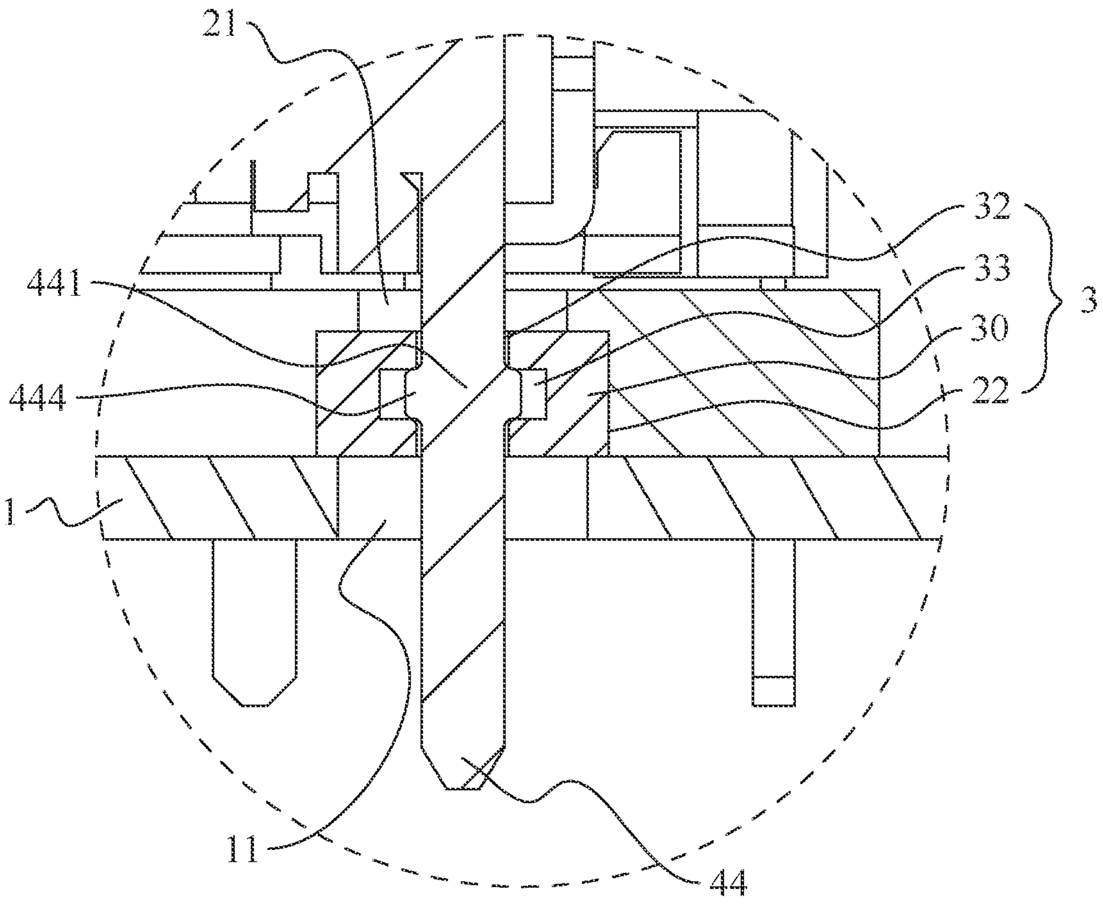
FIG. 13 is an enlarged view of an encircled portion X3 of the joystick module of FIG. 12.
Figure 14:
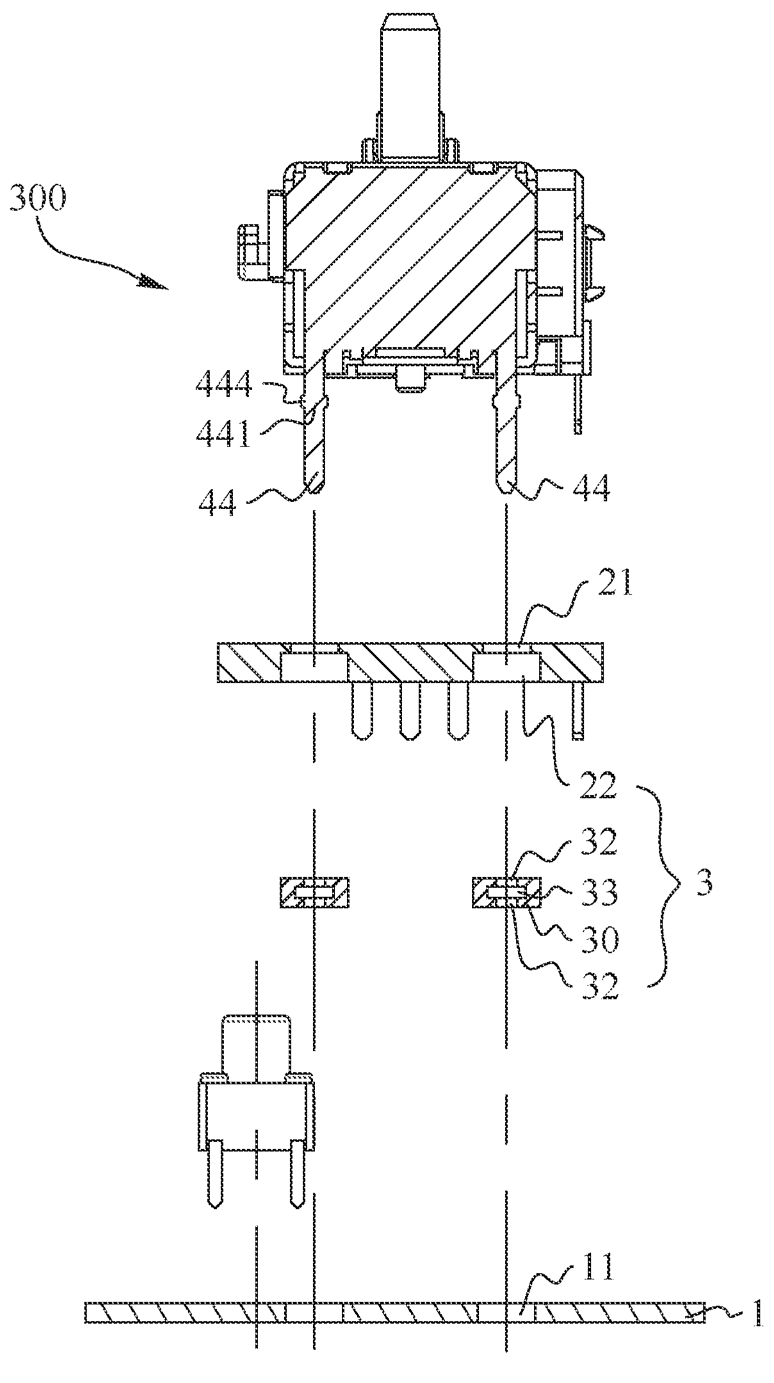
FIG. 14 is an exploded sectional view of the joystick module along the line B-B of FIG. 2, wherein the joystick module is in accordance with the third preferred embodiment of the present invention.

Referring to FIG. 3 and FIG. 4, the circuit board 1 has a plurality of circular insertion holes 11, a plurality of fixing holes 12 and a plurality of pin holes 13. Specifically, the circuit board 1 has four insertion holes 11. The plurality of the insertion holes 11 penetrate through the top surface and a bottom surface of the circuit board 1. The plurality of the insertion holes 11 are corresponding to corresponding mechanisms of the base 2. The plurality of the fixing holes 12 penetrate through the top surface and the bottom surface of the circuit board 1. The plurality of the fixing holes 12 are corresponding to corresponding mechanisms of the switch module 5. The plurality of the pin holes 13 penetrate through the top surface and the bottom surface of the circuit board 1. The plurality of the pin holes 13 are corresponding to corresponding sections of the base 2.

Referring to FIG. 3 to FIG. 7, the base 2 has a plurality of circular insertion grooves 21, a plurality of circular buckling grooves 22, a lacking groove 23, a plurality of pins 24 and a plurality of location holes 25. Specifically, the base 2 has four insertion grooves 21 corresponding to the four insertion holes 11. The plurality of the insertion grooves 21 penetrate through the top surface and a bottom surface of the base 2. Corresponding mechanisms of the steering stick unit 4 penetrate through the plurality of the insertion grooves 21. A bottom of each insertion groove 21 expands outward to form one buckling groove 22 facing towards the circuit board 1. Each insertion groove 21 is disposed at a middle of a top of the one buckling groove 22. The plurality of the buckling grooves 22 penetrate through the top surface and the bottom surface of the base 2. Specifically, the base 2 has four buckling grooves 22. The corresponding mechanisms of the steering stick unit 4 penetrate through the plurality of the buckling grooves 22. The plurality of the insertion grooves 21 are connected with the plurality of the buckling grooves 22. The plurality of the insertion grooves 21 are corresponding to the plurality of the insertion holes 11 of the circuit board 1. The plurality of the buckling grooves 22 are corresponding to the plurality of the insertion holes 11 of the circuit board 1.

In the first preferred embodiment, the plurality of the insertion grooves 21 are disposed to tops of the plurality of the buckling grooves 22. Each buckling groove 22 is close to the circuit board 1. An aperture diameter of each buckling groove 22 is bigger than or equal to an aperture diameter of each insertion groove 21. A middle of one side surface of the base 2 is recessed inward to form the lacking groove 23. The switch module 5 is disposed in the lacking groove 23. The switch module 5 is accommodated in the lacking groove 23. The plurality of the pins 24 are extended downward from several portions of the bottom surface of the base 2. The plurality of the pins 24 are distributed around a front end, a rear end and one side of the bottom surface of the base 2. The one side of the bottom surface of the base 2 is opposite to the lacking groove 23. The plurality of the pins 24 are corresponding to the plurality of the pin holes 13. The plurality of the pins 24 are fastened in the plurality of the pin holes 13. The plurality of the location holes 25 penetrate through the top surface and the bottom surface of the base 2. The plurality of the location holes 25 are corresponding to the plurality of the pins 24 of the front end and the one side of the bottom surface of the base 2. The plurality of the pins 24 are located under the plurality of the location holes 25. The plurality of the pins 24 are electrically conductive in the plurality of the location holes 25. The plurality of the pins 24 are soldered in the plurality of the pin holes 13.

Referring to FIG. 3 to FIG. 7, each buckling unit 3 is a hollow circular block shape. The plurality of the insertion feet 44 are removably fastened with the plurality of the buckling units 3. The plurality of the buckling units 3 have a plurality of buckling rings 30. Each buckling ring 30 is the hollow circular block shape. Specifically, the buckling unit 3 has four buckling rings 30. A middle of each buckling ring 30 of the buckling unit 3 defines a circular penetrating hole 31 vertically penetrating through the middle of each buckling ring 30. The plurality of the buckling rings 30 of the plurality of the buckling units 3 are fastened in the plurality of the buckling grooves 22. The plurality of the buckling rings 30 are tightly buckled in the plurality of the buckling grooves 22. One end of each buckling ring 30 abuts against a bottom wall of one insertion groove 21. The other end of each buckling ring 30 is connected with the top surface of the circuit board 1. The other end of each buckling ring 30 is disposed on a top wall of one insertion hole 11. One end wall of the penetrating hole 31 of each buckling ring 30 abuts against the bottom wall of the one insertion groove 21, and the other end wall of the penetrating hole 31 of each buckling ring 30 abuts against the top wall of the one insertion hole 11. One end of the penetrating hole 31 of each buckling ring 30 is communicated with the one insertion groove 21, and the other end of the penetrating hole 31 of each buckling ring 30 is communicated with the one insertion hole 11.

Each buckling ring 30 is an elastic structure. An outer diameter of each buckling ring 30 is equal to or bigger than the aperture diameter of each buckling groove 22, so the plurality of the buckling rings 30 are buckled in the plurality of the buckling grooves 22, and the plurality of the buckling rings 30 are interfered with inner walls of the plurality of the buckling grooves 22. The plurality of the buckling rings 30 are fastened to bottom ends of the plurality of the insertion grooves 21. The aperture diameter of each insertion groove 21 is smaller than or equal to the aperture diameter of each buckling groove 22, so the plurality of the buckling rings 30 are blocked by peripheral walls of the plurality of the insertion grooves 21. The plurality of the insertion grooves 21 prevent the plurality of the buckling rings 30 breaking away from the plurality of the buckling grooves 22 through the plurality of the insertion grooves 21 which are away from the circuit board 1.

Referring to FIG. 3 to FIG. 7 again, the steering stick unit 4 has a shell 41, a directing stick 42, a pressing protrusion 43, a plurality of insertion feet 44 and a plurality of signal feet 45. The directing stick 42 is extended upward from a middle of a top surface of the shell 41. The directing stick 42 is disposed in the shell 41, and the directing stick 42 is shakable. The directing stick 42 has a shaking function and a pressing function. The pressing protrusion 43 is extended outward from one side of the shell 41. The pressing protrusion 43 is connected with the directing stick 42. The pressing protrusion 43 is corresponding to a corresponding mechanism of the switch module 5. The plurality of the insertion feet 44 are extended downward from several portions of a bottom of the steering stick unit 4. The plurality of the insertion feet 44 penetrate through the plurality of the buckling units 3. The plurality of the insertion feet 44 are extended downward from several portions of a bottom surface of the shell 41. The plurality of the insertion feet 44 penetrate through the plurality of the buckling units 3. Specifically, the steering stick unit 4 has four insertion feet 44. The four insertion feet 44 are inserted into the four insertion grooves 21 and the four insertion holes 11. The plurality of the signal feet 45 are removably fastened in the plurality of the location holes 25.

The plurality of the insertion feet 44 penetrate through the plurality of the insertion grooves 21 of the base 2 and the plurality of the buckling grooves 22 of the base 2, and the plurality of the insertion holes 11 of the circuit board 1. The plurality of the signal feet 45 are extended downward from a front end of a bottom surface of the steering stick unit 4, and one side of the bottom surface of the steering stick unit 4 which is opposite to the pressing protrusion 43. A middle of each insertion foot 44 has a buckling structure 441. The plurality of the buckling structures 441 are formed at the plurality of the insertion feet 44. The plurality of the insertion feet 44 are inserted into the plurality of the buckling units 3. The plurality of the buckling structures 441 are removably fastened in the plurality of the buckling units 3. The plurality of the buckling structures 441 are inserted into the plurality of the insertion holes 11. The plurality of the buckling structures 441 abut against bottom surfaces of the plurality of the buckling units 3. The plurality of the insertion feet 44 are inserted into the plurality of the insertion holes 11. The buckling structure 441 of each insertion foot 44 is fastened in one insertion hole 11 of the circuit board 1. The plurality of the buckling structures 441 of the plurality of the insertion feet 44 abut against bottom surfaces of the plurality of the buckling rings 30, so that the plurality of the buckling structures 441 of the plurality of the insertion feet 44 are cooperated with the plurality of the buckling units 3, the plurality of the buckling structures 441 of the plurality of the insertion feet 44 are assembled with the plurality of the buckling units 3, the plurality of the buckling structures 441 of the plurality of the insertion feet 44 are removably fastened to the plurality of the buckling units 3, the plurality of the buckling structures 441 of the plurality of the insertion feet 44 are buckled with the plurality of the buckling units 3, in this way, the steering stick unit 4 is detachably fastened to the base 2.

In the first preferred embodiment, the plurality of the insertion feet 44 are extended downward from two sides of the front end and two sides of a rear end of the bottom surface of the shell 41. Specifically, the two sides of the front end of the bottom surface of the shell 41 have two insertion feet 44, and the two sides of the rear end of the bottom surface of the shell 41 have the other two insertion feet 44. Each buckling structure 441 is extended outward from the middle of each insertion foot 44. Each buckling structure 441 has a bending portion 442 and an attaching portion 443. The buckling structure 441 is arched outward from the middle of each insertion foot 44. The middle of each insertion foot 44 extends outward to form the attaching portion 443. A top surface of the attaching portion 443 is horizontal to define an attaching surface 445. A free end of the attaching portion 443 is bent downward and rearward to form the bending portion 442.

Specifically, the two insertion feet 44 of the two sides of the front end of the bottom surface of the shell 41 are arched frontward to form two buckling structures 441. Two middles of the two insertion feet 44 of the two sides of the front end of the bottom surface of the shell 41 extend frontward to form two attaching portions 443. Two top surfaces of the two attaching portions 443 are horizontal to define two attaching surfaces 445. Two free ends of the two attaching portions 443 are bent downward and rearward to form two bending portions 442. The other two insertion feet 44 of the two sides of the rear end of the bottom surface of the shell 41 are arched rearward to form the other two buckling structures 441. Two middles of the other two insertion feet 44 of the two sides of the rear end of the bottom surface of the shell 41 extend rearward to form the other two attaching portions 443. Two top surfaces of the other two attaching portions 443 are horizontal to define the other two attaching surfaces 445. Two free ends of the other two attaching portions 443 are bent downward and rearward to form the other two bending portions 442.

When each insertion foot 44 is inserted into one buckling ring 30, the bending portion 442 of each insertion foot 44 is interfered with a bottom wall of one penetrating hole 31 of the buckling unit 3, so a top of the bending portion 442 of each insertion foot 44 is blocked by the one buckling ring 30. The attaching surface 445 of each insertion foot 44 is disposed to a bottom end of the base 2. The attaching surface 445 of each insertion foot 44 abuts against a bottom surface of the one buckling ring 30 to prevent the buckling structure 441 of each insertion foot 44 moving upward to break away from the one buckling ring 30 of the buckling unit 3, so the steering stick unit 4 is fastened to the circuit board 1. The bending portion 442, and the attaching portion 443 together with the attaching surface 445 of each insertion foot 44 are fastened in the one insertion hole 11 of the circuit board 1.

Referring to FIG. 3 and FIG. 4, the switch module 5 is fixed to the top surface of the circuit board 1. The switch module 5 is independent of the steering stick unit 4. The switch module 5 has a switch body 51, a pressing portion 52 and a plurality of switch feet 53. The switch body 51 is disposed to the lacking groove 23 of the base 2. The switch body 51 is fastened to the top surface of the circuit board 1. The pressing portion 52 is extended upward from a middle of a top surface of the switch body 51. The pressing protrusion 43 of the steering stick unit 4 is removably disposed to a top of the switch module 5. The pressing portion 52 is disposed under the pressing protrusion 43 of the steering stick unit 4. When the directing stick 42 of the steering stick unit 4 is pressed downward, the pressing protrusion 43 of the steering stick unit 4 is driven to press the pressing portion 52. The plurality of the switch feet 53 are extended downward from several portions of a bottom surface of the switch body 51. The plurality of the switch feet 53 are soldered to the plurality of the fixing holes 12 of the circuit board 1, so the switch module 5 is electrically connected with the circuit board 1.

Referring to FIG. 1 to FIG. 11, a joystick module 200 in accordance with a second preferred embodiment of the present invention is shown. Differences between the joystick module 100 in accordance with the first preferred embodiment and the joystick module 200 in accordance with the second preferred embodiment are described as follows. In the second preferred embodiment, each buckling ring 30 of the buckling unit 3 is the hollow circular block shape. Each buckling ring 30 of the buckling unit 3 has a circular through hole 32 vertically penetrating through a middle of each buckling ring 30. One side edge of the buckling structure 441 of each insertion foot 44 protrudes outward to form at least one rib 444. In the second preferred embodiment, two opposite side edges of the buckling structure 441 of each insertion foot 44 protrude oppositely to form two ribs 444, respectively.

Each through hole 32 penetrates through a top surface and a bottom surface of the one buckling ring 30. Each through hole 32 is connected with the one insertion hole 11. Each through hole 32 is communicated with the one insertion hole 11. One end wall of each through hole 32 is connected with the bottom wall of the one insertion groove 21 of the base 2. The other end wall of each through hole 32 is connected with the top wall of the one insertion hole 11 of the circuit board 1. A top end of each buckling ring 30 abuts against the bottom wall of the one insertion groove 21 of the base 2. A bottom end of each buckling ring 30 is mounted on the top wall of the one insertion hole 11 of the circuit board 1. When each insertion foot 44 is inserted into the one buckling ring 30, the two ribs 444 of each insertion foot 44 are interfered with an inner wall of one through hole 32. The two ribs 444 of each insertion foot 44 penetrate through the one through hole 32. The two ribs 444 of each insertion foot 44 are fastened in the one insertion hole 11 of the circuit board 1. Each buckling ring 30 is disposed on the two ribs 444 of one insertion foot 44. Each buckling ring 30 blocks tops of the two ribs 444 of the one insertion foot 44.

In the second preferred embodiment, a distance between two outer surfaces of the two ribs 444 of each buckling structure 441 is equal to or bigger than an aperture diameter of the one through hole 32 to prevent the two ribs 444 of each insertion foot 44 moving upward so as to prevent the two ribs 444 of each insertion foot 44 breaking away from the one buckling ring 30 along the through hole 32 of the one buckling ring 30. The two ribs 444 of each insertion foot 44 prevent each insertion foot 44 from breaking away from the buckling unit 3. The two ribs 444 of each insertion foot 44 are fastened in the one insertion hole 11 of the circuit board 1. So the steering stick unit 4 is fastened to the circuit board 1.

Referring to FIG. 1 to FIG. 14, a joystick module 300 in accordance with a third preferred embodiment of the present invention is shown. Differences between the joystick module 100 in accordance with the first preferred embodiment and the joystick module 300 in accordance with the third preferred embodiment are described as follows. In the third preferred embodiment, each buckling ring 30 is the hollow circular block shape. Each buckling ring 30 has the through hole 32 and a buckling hole 33. The through hole 32 of each buckling ring 30 vertically penetrates through middles of the top surface and the bottom surface of each buckling ring 30. The buckling hole 33 is disposed to a middle of the through hole 32. The buckling hole 33 extends radially from an inner wall of the through hole 32. The buckling hole 33 is connected with the through hole 32. The buckling structure 441 has the at least one rib 444.

In the third preferred embodiment, the buckling structure 441 has the two ribs 444. The two ribs 444 of each insertion foot 44 are interfered with the inner wall of the one through hole 32. The two ribs 444 of each insertion foot 44 are inserted into the one through hole 32. The two ribs 444 of each insertion foot 44 penetrate through the one through hole 32. When each insertion foot 44 is inserted into the one buckling ring 30, the two ribs 444 of each insertion foot 44 are fastened in the buckling hole 33, the two ribs 444 of each insertion foot 44 are blocked by two sides of a top wall of the buckling hole 33 and two sides of a bottom wall of the buckling hole 33 to prevent the two ribs 444 of each insertion foot 44 moving upward to break away from the through hole 32 or falling downward from the through hole 32 of the one buckling ring 30. The two ribs 444 of each insertion foot 44 prevent each insertion foot 44 moving upward to break away from the through hole 32 of the one buckling ring 30 or falling downward from the through hole 32 of the one buckling ring 30 of the buckling unit 3. The steering stick unit 4 is fastened to the circuit board 1.

Referring to FIG. 1 to FIG. 14, in the first preferred embodiment or the second preferred embodiment, the plurality of the signal feet 45 are inserted into the plurality of the location holes 25 of the base 2. The plurality of the pins 24 are inserted into the plurality of the pin holes 13 of the circuit board 1. The plurality of the signal feet 45 are fastened in the plurality of the location holes 25 of the base 2, the plurality of the signal feet 45 are interfered with the plurality of the location holes 25 of the base 2 to avoid a soldering process, so the plurality of the signal feet 45 are electrically connected with the plurality of the pins 24 of the base 2 through the plurality of the location holes 25 of the base 2. In this way, the steering stick unit 4 is fastened to the base 2, and the steering stick unit 4 is electrically connected with the circuit board 1. The plurality of the switch feet 53 are fastened to the plurality of the fixing holes 12 of the circuit board 1 to be soldered in the plurality of the fixing holes 12 of the circuit board 1, so the switch module 5 is electrically connected with the circuit board 1.

As described above, the steering stick unit 4 and the switch module 5 are independently disposed to the circuit board 1, the switch module 5 is soldered to the circuit board 1, the base 2 is disposed to the circuit board 1, the buckling unit 3 is disposed in the base 2, and the buckling structures 441 of the steering stick unit 4 are buckled with the plurality of the buckling units 3, so when the steering stick unit 4 needs detaching and changing, a user has no need of desoldering the steering stick unit 4. The steering stick unit 4 is directly pulled out from the joystick module 100, and a new steering stick unit is assembled to the joystick module 100. As a result, the steering stick unit 4 is able to be quickly assembled to the joystick module 100 to be applied in a game controller, and the steering stick unit 4 is able to be disassembled from the joystick module 100 simply and quickly. In addition, the user changes the joystick module 100 directly without using a desoldering tool.

What is claimed is:

1. A joystick module, comprising:

a circuit board;

a base disposed on a top surface of the circuit board, the base being soldered to the circuit board, the base being fastened to the circuit board, the base being electrically connected with the circuit board, the base being equipped with a plurality of hollow buckling units, the plurality of the buckling units being disposed between the circuit board and the base;

a steering stick unit detachably fastened to a top surface of the base, the steering stick unit having a shell, a directing stick extended upward from a middle of a top surface of the shell, a pressing protrusion extended outward from one side of the shell, and a plurality of insertion feet extended downward from several portions of a bottom surface of the shell, the directing stick being disposed in the shell, and the directing stick being shakable, the pressing protrusion being connected with the directing stick, the plurality of the insertion feet penetrating through the plurality of the buckling units;

a switch module electrically connected with the circuit board, the switch module being disposed to one side of the steering stick unit, the switch module having a switch body, the switch body being fastened to the top surface of the circuit board, a pressing portion extended upward from a top surface of the switch body, the pressing portion being disposed under the pressing protrusion; and a plurality of buckling structures formed at the plurality of the insertion feet, the plurality of the buckling structures being cooperated with the plurality of the buckling units, the plurality of the buckling structures being assembled with the plurality of the buckling units, the plurality of the buckling structures being buckled with the plurality of the buckling units.

2. The joystick module as claimed in claim 1, wherein the base has a plurality of insertion grooves and a plurality of buckling grooves, the plurality of the insertion grooves penetrate through the top surface and a bottom surface of the base, a bottom of each insertion groove expands outward to form one buckling groove facing towards the circuit board, the plurality of the buckling grooves penetrate through the top surface and the bottom surface of the base, each buckling groove is close to the circuit board, the plurality of the insertion feet penetrate through the plurality of the insertion grooves and the plurality of the buckling grooves, the buckling unit has a plurality of buckling rings, the plurality of the buckling rings are tightly buckled in the plurality of the buckling grooves.

3. The joystick module as claimed in claim 2, wherein an outer diameter of each buckling ring is equal to or bigger than an aperture diameter of each buckling groove, an aperture diameter of each insertion groove is smaller than or equal to the aperture diameter of each buckling groove.

4. The joystick module as claimed in claim 2, wherein a middle of each buckling ring of the buckling unit defines a penetrating hole vertically penetrating through the middle of each buckling ring, the buckling structure is arched outward from a middle of each insertion foot, each buckling structure has a bending portion and an attaching portion, the middle of each insertion foot extends outward to form the attaching portion, a top surface of the attaching portion is horizontal to define an attaching surface, a free end of the attaching portion is bent downward and rearward to form the bending portion, when each insertion foot is inserted into one buckling ring, the bending portion of each insertion foot is interfered with a bottom wall of one penetrating hole of the buckling unit, so a top of the bending portion of each insertion foot is blocked by one buckling ring, the attaching surface of each insertion foot abuts against a bottom surface of the one buckling ring, the plurality of the buckling structures abut against the bottom surfaces of the plurality of the buckling rings.

5. The joystick module as claimed in claim 4, wherein each buckling ring has a through hole vertically penetrating through a middle of each buckling ring, two opposite side edges of the buckling structure of each insertion foot protrude oppositely to form two ribs, respectively, a distance between two outer surfaces of the two ribs of each buckling structure is equal to or bigger than an aperture diameter of one through hole, when each insertion foot is inserted into one buckling ring, the two ribs of each insertion foot are interfered with an inner wall of the one through hole, the two ribs of each insertion foot penetrate through the one through hole, each buckling ring is disposed on the two ribs of one insertion foot, each buckling ring blocks tops of the two ribs of the one insertion foot.

6. The joystick module as claimed in claim 5, wherein the circuit board has a plurality of insertion holes, the plurality of the insertion holes penetrate through the top surface and a bottom surface of the circuit board, the plurality of the insertion grooves are corresponding to the plurality of the insertion holes, the plurality of the buckling grooves are corresponding to the plurality of the insertion holes, one end wall of each through hole is connected with a bottom wall of one insertion groove of the base, the other end wall of each through hole is connected with a top wall of one insertion hole of the circuit board, a top end of each buckling ring abuts against the bottom wall of the one insertion groove of the base, a bottom end of each buckling ring is mounted on the top wall of the one insertion hole of the circuit board, the bending portion, and the attaching portion together with the attaching surface of each insertion foot are fastened in the one insertion hole.

7. The joystick module as claimed in claim 5, wherein the circuit board has a plurality of insertion holes penetrating through the top surface and a bottom surface of the circuit board, each through hole is connected with one insertion hole, each through hole is communicated with the one insertion hole, the two ribs of each insertion foot are fastened in the one insertion hole of the circuit board.

8. The joystick module as claimed in claim 2, wherein each buckling ring has a through hole and a buckling hole, the through hole of each buckling ring vertically penetrates through middles of a top surface and the bottom surface of each buckling ring, the buckling hole is disposed to a middle of the through hole, the buckling hole extends radially from an inner wall of the through hole, the buckling hole is connected with the through hole, two opposite side edges of the buckling structure of each insertion foot protrude oppositely to form two ribs, respectively, when each insertion foot is inserted into one buckling ring, the two ribs of each insertion foot are fastened in the buckling hole.

9. A joystick module, comprising:

a circuit board having a plurality of pin holes penetrating through a top surface and a bottom surface of the circuit board;

a base fastened to the top surface of the circuit board, the base having a plurality of buckling grooves, a plurality of pins and a plurality of location holes, the plurality of the buckling grooves penetrating through a top surface and a bottom surface of the base, the plurality of the pins being fastened in the plurality of the pin holes, the plurality of the pins being electrically conductive in the plurality of the location holes;

a plurality of hollow buckling units fastened in the plurality of the buckling grooves, the plurality of the buckling units being disposed between the circuit board and the base;

a steering stick unit disposed to the top surface of the base, the steering stick unit having a shell, a directing stick extended upward from a middle of a top surface of the shell, a pressing protrusion extended outward from one side of the shell, and a plurality of insertion feet extended downward from several portions of a bottom surface of the shell, the directing stick being shakable, the pressing protrusion being connected with the directing stick, the plurality of the insertion feet being inserted into the plurality of the buckling units, the plurality of the signal feet being extended downward from a front end of a bottom surface of the steering stick unit, and one side of the bottom surface of the steering stick unit which is opposite to the pressing protrusion, the plurality of the signal feet being removably fastened in the plurality of the location holes, so the plurality of the signal feet being electrically connected with the plurality of the pins through the plurality of the location holes;

a switch module electrically connected with the circuit board, the pressing protrusion of the steering stick unit being disposed to a top of the switch module; and a plurality of buckling structures formed at the plurality of the insertion feet, the plurality of the buckling structures being assembled with the plurality of the buckling units, the plurality of the buckling structures being removably fastened to the plurality of the buckling units, the plurality of the buckling structures being buckled with the plurality of the buckling units.

10. The joystick module as claimed in claim 9, wherein the base has a plurality of insertion grooves, the plurality of the insertion grooves penetrate through the top surface and the bottom surface of the base, a bottom of each insertion groove expands outward to form one buckling groove facing towards the circuit board, each buckling groove is close to the circuit board, the plurality of the insertion feet penetrate through the plurality of the insertion grooves and the plurality of the buckling grooves, the buckling unit has a plurality of buckling rings, the plurality of the buckling rings are tightly buckled in the plurality of the buckling grooves.

11. The joystick module as claimed in claim 10, wherein an outer diameter of each buckling ring is equal to or bigger than an aperture diameter of each buckling groove, an aperture diameter of each insertion groove is smaller than or equal to the aperture diameter of each buckling groove.

12. The joystick module as claimed in claim 10, wherein a middle of each buckling ring of the buckling unit defines a penetrating hole vertically penetrating through the middle of each buckling ring, the buckling structure is arched outward from a middle of each insertion foot, each buckling structure has a bending portion and an attaching portion, the middle of each insertion foot extends outward to form the attaching portion, a top surface of the attaching portion is horizontal to define an attaching surface, a free end of the attaching portion is bent downward and rearward to form the bending portion, when each insertion foot is inserted into one buckling ring, the bending portion of each insertion foot is interfered with a bottom wall of one penetrating hole of the buckling unit, so a top of the bending portion of each insertion foot is blocked by one buckling ring, the attaching surface of each insertion foot abuts against a bottom surface of the one buckling ring, the plurality of the buckling structures abut against the bottom surfaces of the plurality of the buckling rings.

13. The joystick module as claimed in claim 12, wherein each buckling ring has a through hole vertically penetrating through a middle of each buckling ring, two opposite side edges of the buckling structure of each insertion foot protrude oppositely to form two ribs, respectively, a distance between two outer surfaces of the two ribs of each buckling structure is equal to or bigger than an aperture diameter of one through hole, when each insertion foot is inserted into one buckling ring, the two ribs of each insertion foot are interfered with an inner wall of the one through hole, the two ribs of each insertion foot penetrate through the one through hole, each buckling ring is disposed on the two ribs of one insertion foot, each buckling ring blocks tops of the two ribs of the one insertion foot.

14. The joystick module as claimed in claim 13, wherein the circuit board has a plurality of insertion holes, the plurality of the insertion holes penetrate through the top surface and the bottom surface of the circuit board, the plurality of the insertion grooves are corresponding to the plurality of the insertion holes, the plurality of the buckling grooves are corresponding to the plurality of the insertion holes, one end wall of each through hole is connected with a bottom wall of one insertion groove of the base, the other end wall of each through hole is connected with a top wall of one insertion hole of the circuit board, a top end of each buckling ring abuts against the bottom wall of the one insertion groove of the base, a bottom end of each buckling ring is mounted on the top wall of the one insertion hole of the circuit board, the bending portion, and the attaching portion together with the attaching surface of each insertion foot are fastened in the one insertion hole.

15. The joystick module as claimed in claim 13, wherein the circuit board has a plurality of insertion holes penetrating through the top surface and the bottom surface of the circuit board, each through hole is connected with one insertion hole, each through hole is communicated with the one insertion hole, the two ribs of each insertion foot are fastened in the one insertion hole of the circuit board.

16. The joystick module as claimed in claim 10, wherein each buckling ring has a through hole and a buckling hole, the through hole of each buckling ring vertically penetrates through middles of a top surface and the bottom surface of each buckling ring, the buckling hole is disposed to a middle of the through hole, the buckling hole extends radially from an inner wall of the through hole, the buckling hole is connected with the through hole, two opposite side edges of the buckling structure of each insertion foot protrude oppositely to form two ribs, respectively, when each insertion foot is inserted into one buckling ring, the two ribs of each insertion foot are fastened in the buckling hole.

17. A joystick module, comprising:

a circuit board having a plurality of insertion holes penetrating through a top surface and a bottom surface of the circuit board, and a plurality of pin holes penetrating through the top surface and the bottom surface of the circuit board;

a base fastened to the top surface of the circuit board, the base being soldered to the circuit board, the base being electrically connected with the circuit board, the base having:

a plurality of insertion grooves penetrating through a top surface and a bottom surface of the base;

a plurality of buckling grooves penetrating through the top surface and the bottom surface of the base, each insertion groove being disposed at a middle of a top of one buckling groove;

a plurality of pins extended downward from several portions of the bottom surface of the base, the plurality of the pins being soldered in the plurality of the pin holes; and a plurality of location holes penetrating through the top surface and the bottom surface of the base, the plurality of the pins being electrically conductive in the plurality of the location holes;

a plurality of hollow buckling units fastened in the plurality of the buckling grooves, the plurality of the buckling units being disposed between the circuit board and the base, the plurality of the buckling units having a plurality of buckling rings, the plurality of the buckling rings being fastened in the plurality of the buckling grooves, a middle of each buckling ring defining a penetrating hole vertically penetrating through the middle of each buckling ring;

a steering stick unit removably disposed to the top surface of the base, the steering stick unit having:

a shell;

a directing stick extended upward from a middle of a top surface of the shell, the directing stick being shakable;

a pressing protrusion extended outward from one side of the shell, the pressing protrusion being connected with the directing stick;

a plurality of insertion feet extended downward from several portions of a bottom surface of the shell, the plurality of the insertion feet being inserted into the plurality of the insertion holes, the plurality of the insertion feet being removably fastened with the plurality of the buckling units; and a plurality of signal feet extended downward from a front end of a bottom surface of the steering stick unit, the plurality of the signal feet being removably fastened with the plurality of the location holes;

a switch module fixed to the top surface of the circuit board, the switch module being electrically connected with the circuit board, the switch module being independent of the steering stick unit, the pressing protrusion of the steering stick unit being removably disposed to a top of the switch module; and a plurality of buckling structures formed at the plurality of the insertion feet, the plurality of the buckling structures being removably fastened in the plurality of the buckling units, each buckling structure having a bending portion and an attaching portion, a middle of each insertion foot extending outward to form the attaching portion, a top surface of the attaching portion being horizontal to define an attaching surface, a free end of the attaching portion being bent downward and rearward to form the bending portion, the attaching surface of each insertion foot abutting against a bottom surface of one buckling ring, a top of the bending portion of each insertion foot being blocked by the one buckling ring, the bending portion, and the attaching portion together with the attaching surface of each insertion foot being fastened in one insertion hole.

18. The joystick module as claimed in claim 17, wherein an outer diameter of each buckling ring is equal to or bigger than an aperture diameter of each buckling groove, an aperture diameter of each insertion groove is smaller than or equal to the aperture diameter of each buckling groove.

19. The joystick module as claimed in claim 17, wherein the plurality of the buckling structures are inserted into the plurality of the insertion holes, the plurality of the buckling structures abuts against bottom surfaces of the plurality of the buckling units.

* * * * *